(12) United States Patent
Childers et al.

(10) Patent No.: US 8,559,781 B2
(45) Date of Patent: Oct. 15, 2013

(54) REMOVABLE SLEEVE FOR FIBER OPTIC CONNECTORS FOR HIGH DENSITY APPLICATIONS

(75) Inventors: Darrell R. Childers, Hickory, NC (US); Myron Yount, Conover, NC (US); Russell Granger, Vale, NC (US); Joe Howard, Hickory, NC (US); Alan Benner, Poughkeepsie, NY (US); Robert K. Mullady, Highland, NY (US)

(73) Assignee: US Conec, Ltd., Hickory, NC (US)

( * ) Notice: Subject to any disclaimer, the term of this patent is extended or adjusted under 35 U.S.C. 154(b) by 60 days.

(21) Appl. No.: 12/614,391

(22) Filed: Nov. 6, 2009

(65) Prior Publication Data

US 2011/0019962 A1  Jan. 27, 2011

Related U.S. Application Data

(60) Provisional application No. 61/112,714, filed on Nov. 7, 2008.

(51) Int. Cl.
*G02B 6/44* (2006.01)

(52) U.S. Cl.
USPC .......................................... 385/134

(58) Field of Classification Search
None
See application file for complete search history.

(56) References Cited

U.S. PATENT DOCUMENTS

| 4,834,486 | A  | * | 5/1989 | Walker ........................ 385/134 |
| 6,102,581 | A  | * | 8/2000 | Deveau et al. ................. 385/56 |
| 6,352,444 | B1 | * | 3/2002 | Yuzawa ....................... 439/353 |
| 6,364,685 | B1 | * | 4/2002 | Manning ...................... 439/357 |
| 6,419,399 | B1 | * | 7/2002 | Loder et al. ................... 385/53 |
| 6,848,836 | B2 | * | 2/2005 | Ueda et al. .................... 385/78 |
| 7,407,330 | B2 | * | 8/2008 | Smith et al. ................... 385/53 |
| 7,583,883 | B2 | * | 9/2009 | Kowalczyk et al. ........... 385/134 |
| 8,244,089 | B2 | * | 8/2012 | Chen et al. .................... 385/134 |
| 2007/0140623 | A1 | * | 6/2007 | Desanti .......................... 385/76 |
| 2008/0310800 | A1 | * | 12/2008 | Shibata et al. ................. 385/92 |

* cited by examiner

*Primary Examiner* — Tina Wong
(74) *Attorney, Agent, or Firm* — Michael L. Leetzow, P.A.

(57) ABSTRACT

A sleeve has a handle and extensions to engage a fiber optic connector for insertion into and removal from high density adapters. The sleeve may have multiple connectors installed in a single sleeve and it may be removable. The sleeve has first and second extensions to engage the inner and outer housings, respectively, to insert and remove the fiber optic connector from an adapter.

18 Claims, 7 Drawing Sheets

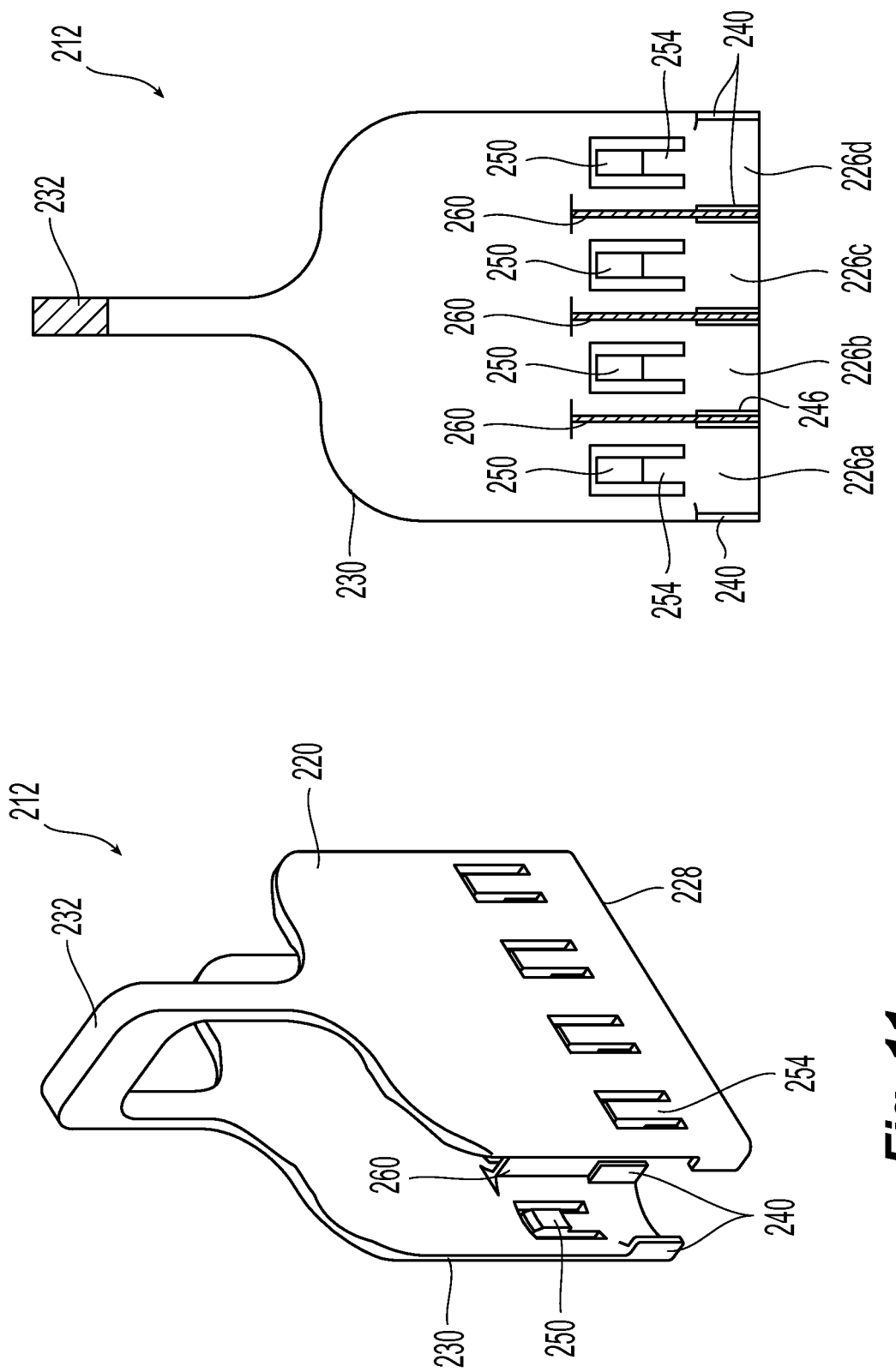

US 8,559,781 B2

REMOVABLE SLEEVE FOR FIBER OPTIC CONNECTORS FOR HIGH DENSITY APPLICATIONS

REFERENCE TO RELATED CASE

This application claims priority under 35 U.S.C. §119 (e) to provisional application No. 61/112,714 filed on Nov. 7, 2008, which is hereby incorporated by reference in its entirety.

BACKGROUND OF THE INVENTION

Field of the Invention

The MTP fiber optic connector, when installed in high density applications, can be very difficult to install in, and uninstall from, its respective adapter. Adjacent fiber optic connectors are generally located too close to allow manual insertion and removal of the fiber optic connectors using the connector's outer housing as intended, particularly, when used in lower density applications. To facilitate these processes, a component was desired that possessed a smaller cross section that could be grasped to install and uninstall a fiber optic connector when in a high density application.

SUMMARY OF THE INVENTION

The present invention is directed to a sleeve to be attached to an outer portion of a fiber optic connector to assist in installing and removing the fiber optic connector from an adapter that includes a body having an interior surface and an exterior surface, the interior surface defining a central opening extending between a front end and a back end, at least one first extension extending from the body, at least one second extension extending from the interior surface into the central opening, the at least one second extension disposed between the at least one first extension and the back end, and an extended portion extending from a portion of the body away from the front end and beyond the back end.

In some embodiments, the sleeve is removable.

In some embodiments, there are more than one first and second extensions.

In some embodiments, there is more than one central opening for more than one fiber optic connector.

In another aspect, the invention is directed to a combination of a sleeve and a fiber optic connector, the fiber optic connector having an inner housing and an outer housing, the sleeve being attached to the fiber optic connector and includes a body having an interior surface and an exterior surface, the interior surface defining a central opening extending between a front end and a back end to receive the fiber optic connector, at least one first extension extending from the body to engage the outer housing, at least two second extensions extending from the interior surface into the central opening to engage the inner housing, the at least one second extension disposed between the at least one first extension and the back end, and an extended portion extending from a portion of the body away from the front end and beyond the back end.

In yet another aspect, the invention is directed to a sleeve to install and remove multiple fiber optic connectors from a high density application, the removable sleeve includes a body having a front end and a back end and at least two central openings extending therebetween, each of the central openings configured to removably receive a fiber optic connector therein, each of the central openings having an internal surface, at least one first extension extending from the internal surface of each central opening to engage the outer housing, at least one second extension extending from the interior surface of each central opening to engage the inner housing, the at least one second extension disposed between the at least one first extension and the back end; and an extended portion extending from a portion of the body away from the front end and beyond the back end to be used in installing and removing the fiber optic connector from an adapter.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 11 is a perspective view of another embodiment of a sleeve according to the present invention;

FIG. 12 is across sectional view of the sleeve in FIGS. 11; and

DETAILED DESCRIPTION OF THE PREFERRED EMBODIMENTS

Figure 1:
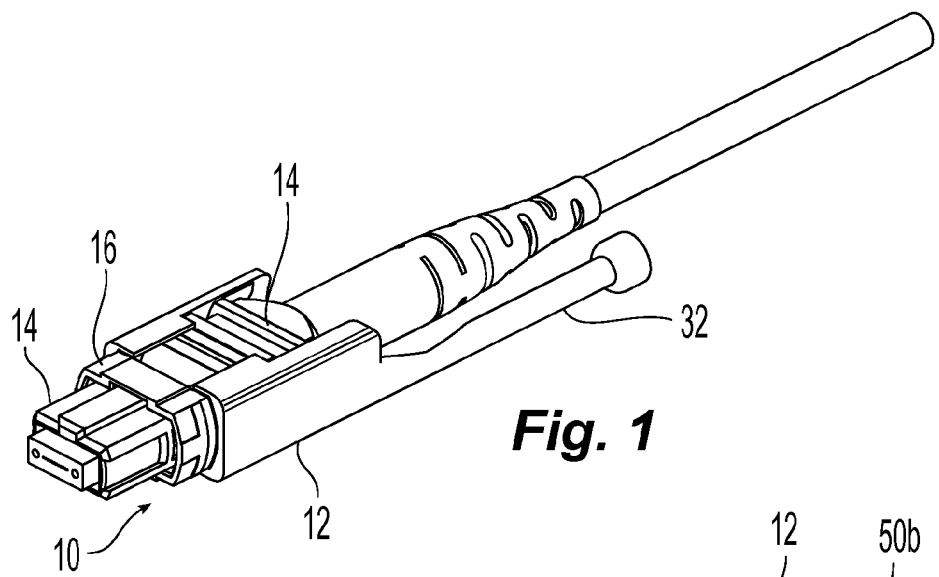
FIG. 1 is a perspective view of a sleeve according to the present invention attached to a fiber optic connector

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, a fiber optic connector 10 is illustrated with a sleeve 12 according to one embodiment of the present invention. The fiber optic connector 10 is illustrated as being an MTP® fiber optic connector, available from US Conec, but could be any connector that has push-pull features. The fiber optic connector 10 has an inner housing 14 and an outer housing 16. The inner housing 14 and the outer housing 16 move relative to one another on the fiber optic connector 10. The sleeve 12 also moves relative to the outer housing 16 and the inner housing 14. The sleeve 12 is preferably removable, that is it can be mounted on pre-existing fiber optic connectors 10 or it may be mounted on the fiber optic connector so that it cannot be easily removed.

Figure 2:
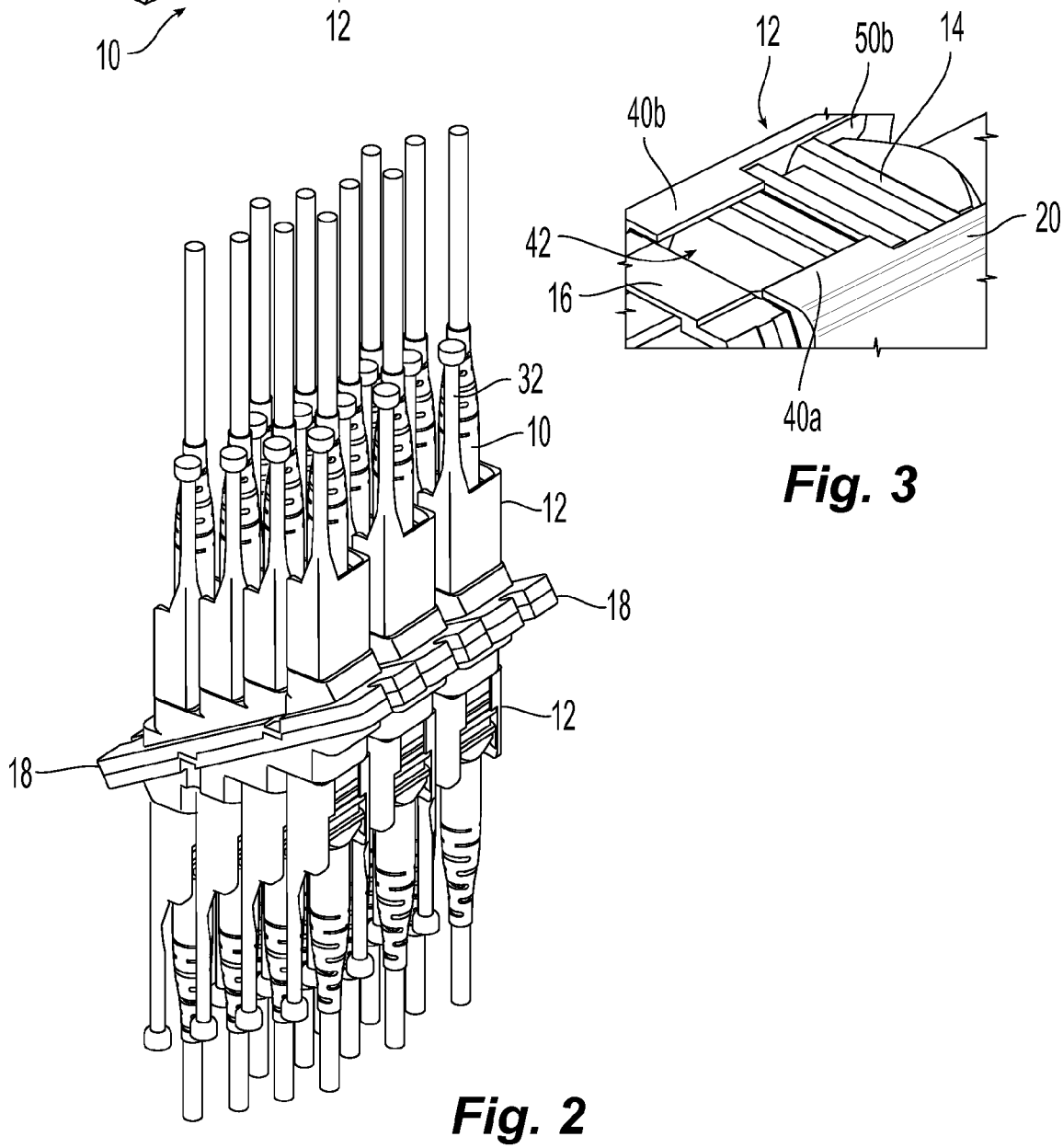
FIG. 2 is a perspective view of multiple fiber optic connectors installed in a high density application with each of the fiber optic connectors with a sleeve as illustrated in FIG. 1.

The sleeve 12 is preferably used in high density applications as illustrated in FIG. 2. With the requirement for higher speed communication and a limited amount of space, the density of the applications have become higher. As illustrated in FIG. 2, there are three adapters 18, each with four fiber optic connectors 10, that are side-by-side. In any given application, there could be more or fewer of the adapters 18 or the fiber optic connectors 10. As can be seen, the fiber optic connectors 10 in the center two positions of the middle adapter 18 would be difficult to access, particularly if the person has large fingers. In order to remove those fiber optic connectors 10, at least some of the surrounding fiber optic connectors would have to be removed first, interrupting the data flow. As can also be seen in FIG. 2, with the sleeves 12 connected to the fiber optic connectors 10, each of the fiber optic connectors 10 could easily be removed without having to bother the surrounding fiber optic connectors.

Figure 3:
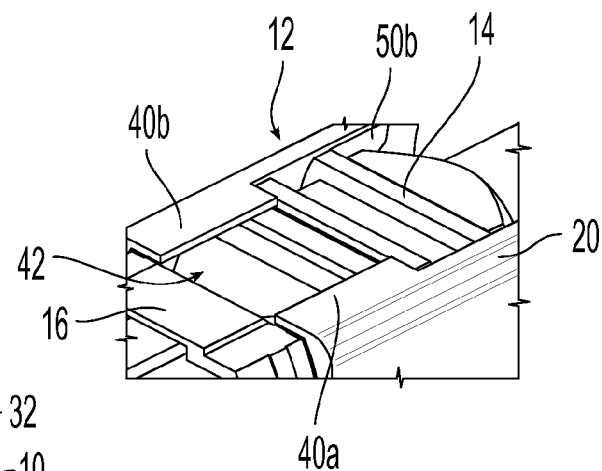
FIG. 3 is an enlarged view of the extensions that engage the inner and outer housing of the fiber optic connector according to the prior art.
Figure 4:
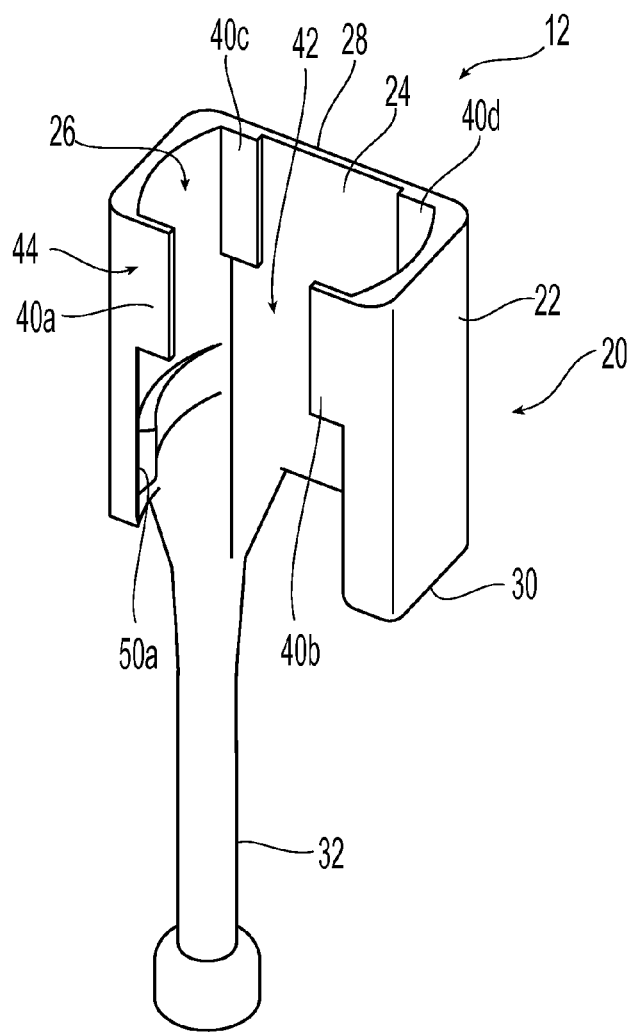
FIG. 4 is a perspective view of the sleeve illustrated in FIG. 1.
Figure 5:
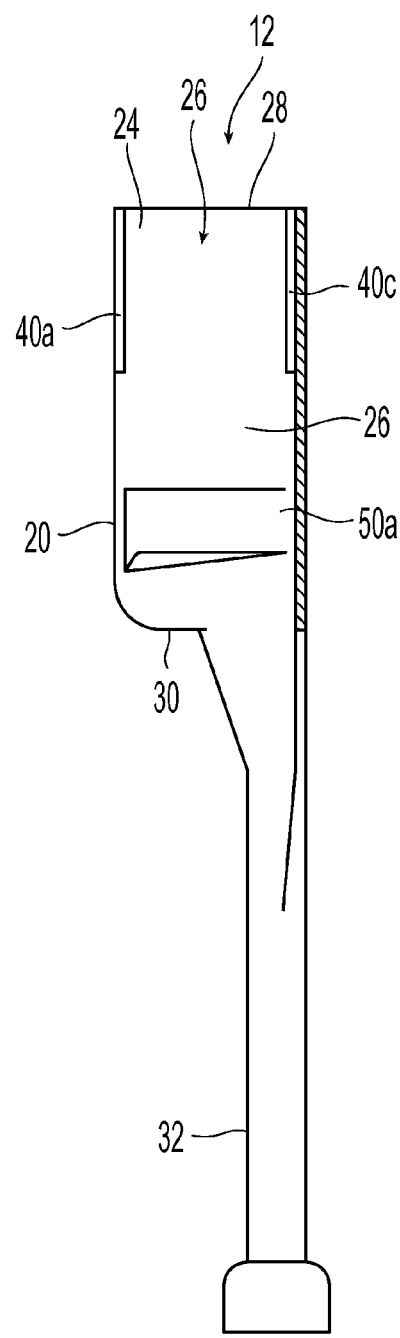
FIG. 5 is a cross sectional view of the sleeve in FIG. 4.

Turning now to FIGS. 3-5, the sleeve 12 will be described in more detail. Sleeve 12 has a body 20 with an external surface 22 and an internal surface 24. The interior surface 24 defines a central opening 26 that extends between a front end 28 and a back end 30. Extending from the body 20 is an extended portion or handle 32 that extends away from the front end 28 and beyond the back end 30 to allow a user to grasp the sleeve 12 as illustrated in FIG. 2. While the handle 32 is illustrated on one of the lower corners, it may be located anywhere around the body 20 and still fall within the scope of the present invention.

The sleeve 12 also has first extensions 40 that are disposed in the sleeve 12 to engage the outer housing 16 such that when the sleeve 12 is pulled, the first extensions 40 engage the outer housing 16, causing the fiber optic connector 10 to be released from the adapter 18. The first extensions 40 are illustrated as projections 40a and 40b in FIGS. 3 and 4 that extend from the body 20 toward one another to engage a raised rib of the outer housing 16 (see FIG. 3). As can be seen, particularly in FIGS. 1 and 4, the sleeve 12 preferably has an opening 42 along one of the sides 44 that extends from the front end 28 to the back end 30 and the first extensions 40a and 40b extend from the body 20 towards one another and into the opening 42. The first extensions 40 also include extensions 40c and 40d, which are raised portions extending from the internal surface 24 into the central opening 26. As the first extensions 40a and 40b engage the outer housing 16 on the top side of the fiber optic connector, the first extensions 40c and 40d engage the outer housing 16 on the bottom side. While four first extensions 40a-40d are illustrated, only one of the first extensions is needed to be able to remove the fiber optic connector 10 from the adapter 18. It should be noted that any one of the four first extensions 40a-40d could be used. Also, while the opening 42 is illustrated on the top of the fiber optic connector 10, it could also be disposed on the bottom. In an alternative, there need not be an opening 42 at all and the first extensions 40a-40b could be more like the raised portions of 40c-40d rather than the tabs as illustrated. It should be noted that all of the first extensions 40a-40d preferably have a flat surface that engages a corresponding flat surface on the outer housing 16.

The sleeve 12 also has second extensions 50 disposed on the internal surface 24 to engage the inner housing 14. The second extensions 50 are preferably raised portions 50a and 50b that extend into the central opening 26 from the internal surface 24. As illustrated in FIGS. 4 and 5, the second extensions 50 may be crescent shaped extensions with a flat surface that faces toward the front end 28 of the sleeve to engage a corresponding flat surface of the inner housing 14 to push the fiber optic connector 10 into the adapter 18. While the second extensions 50 are illustrated as being on the side walls of the sleeve 12, they may also be disposed on the bottom wall as are the first extensions 40c, 40d. Moreover, as with the first extensions 40, only one of the second extensions 50 is needed to push the fiber optic connector 10 into the adapter 18.

Figure 6:
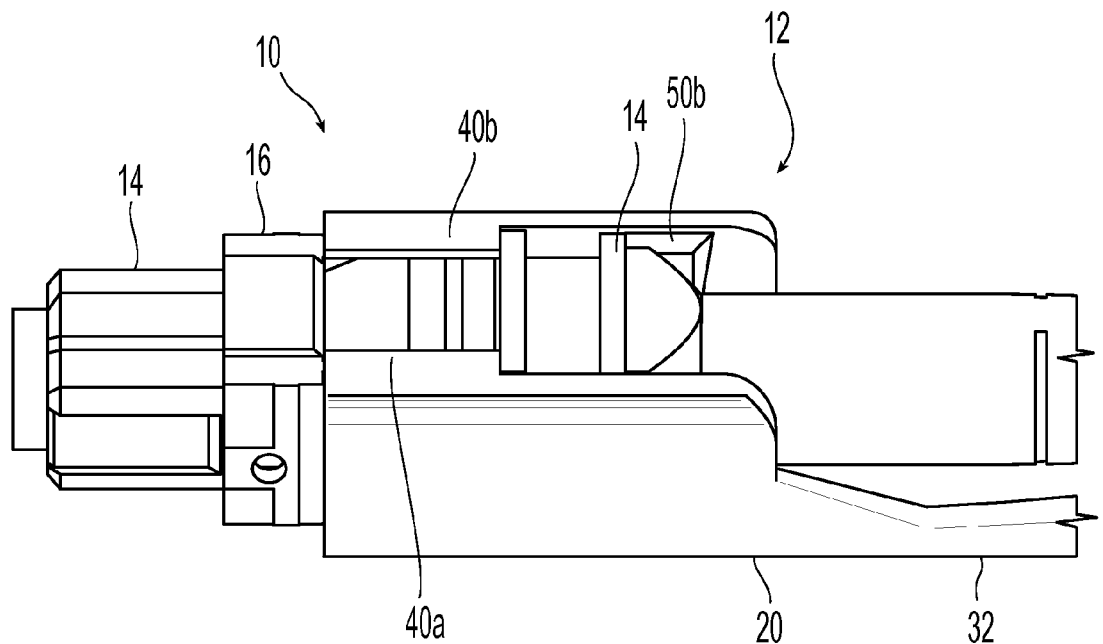
FIG. 6 is an enlarged view of the sleeve of FIGS. 1 and 4 illustrating the relationship between the inner and outer housings of the fiber optic connector and the extensions on the sleeve.
Figure 7:
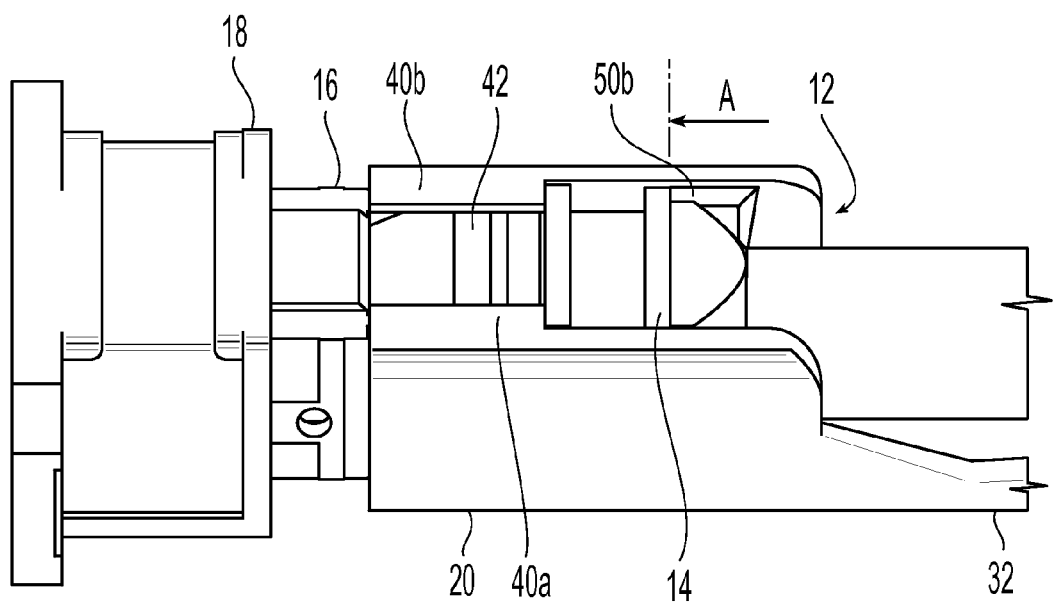
FIG. 7 illustrates the second extensions engaging the inner housing when the fiber optic connector is installed in an adapter.
Figure 8:
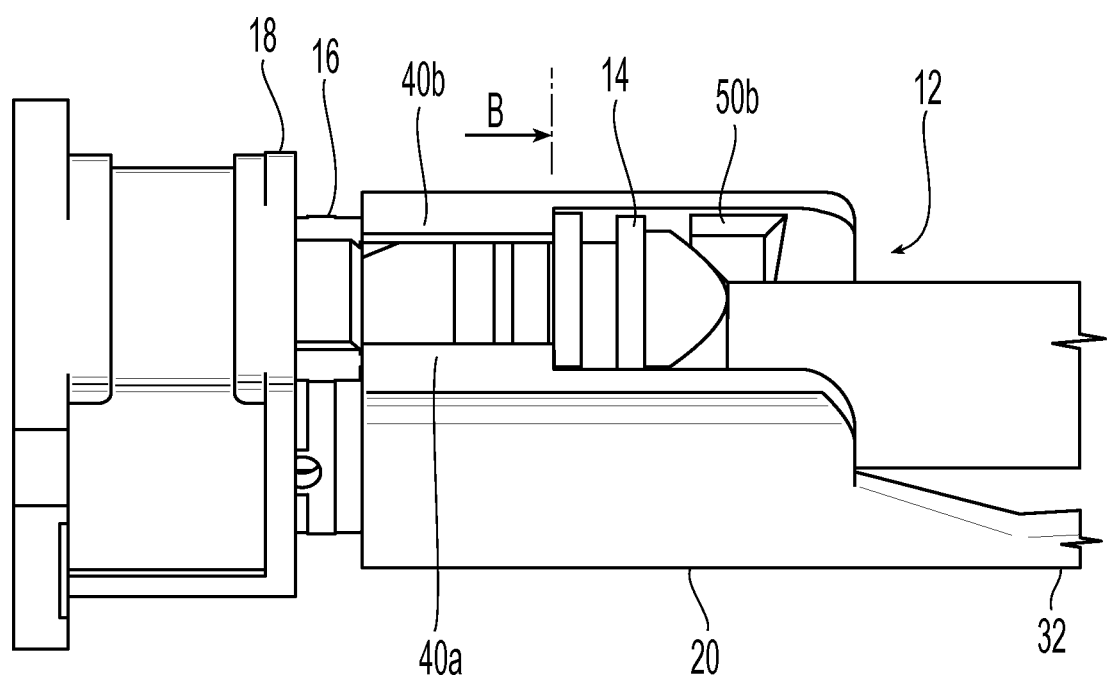
FIG. 8 illustrates the first extensions engaging the outer housing when the fiber optic connector is removed from an adapter.

The operation of the sleeve will now be described with reference to FIGS. 6-8. FIG. 6 illustrates the sleeve 12 in a non-engaged position. Neither the first extensions 40 or the second extensions 50 are engaging the outer housing 16 or the inner housing 14, respectively. Thus, there is a some clearance between the housings and the extensions. When the fiber optic connector 10 is being pushed into the adapter 18, the second extensions 50 will engage a portion of the inner housing 14, pushing the whole fiber optic connector 10 into the adapter 18 as illustrated in FIG. 7. The arrow A illustrates where the force is being applied to the connector 10. It should be noted that the first extensions 40 are not engaging the outer housing 16 during the insertion process. The sleeve 12 is pushed until the inner and outer housings 14,16 engage the adapter 18. When the fiber optic connector 10 is to be removed from the adapter 18, the user pulls on the handle 32. This force causes the sleeve 12 to move backward relative to the fiber optic connector 10, and in particular the outer housing 16. The first extensions 40 will engage the rib of the outer housing 16 and apply a force illustrated by arrow B on the outer housing 16 freeing the fiber optic connector 10 from the adapter 18.

Figure 9:
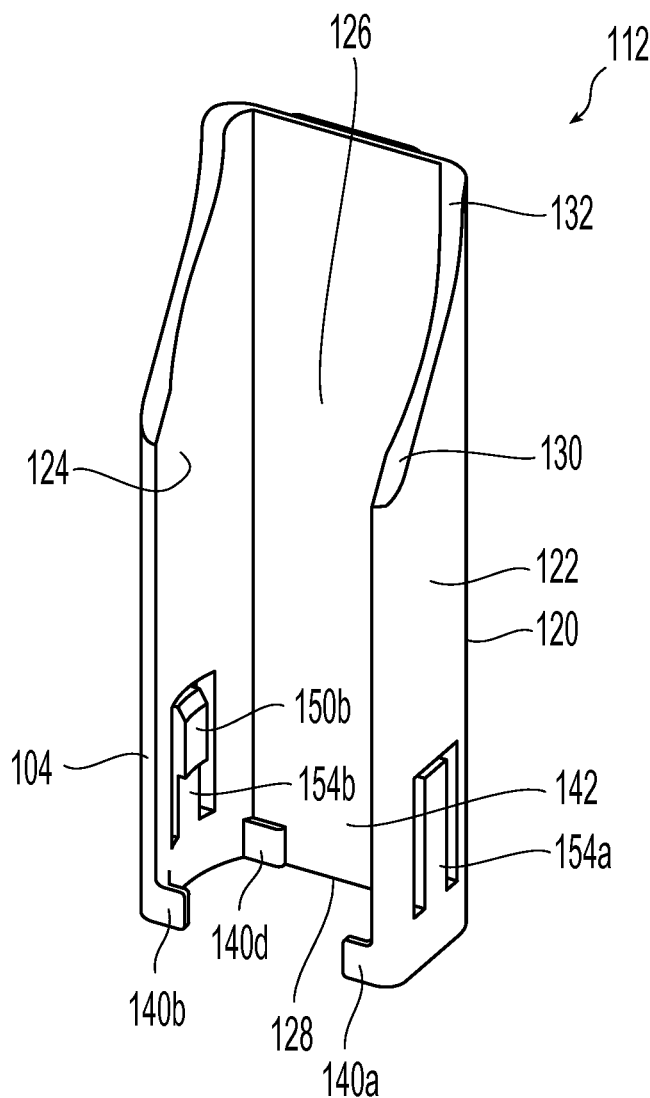
FIG. 9 is a perspective view of another embodiment of a sleeve according to the present invention.
Figure 10:
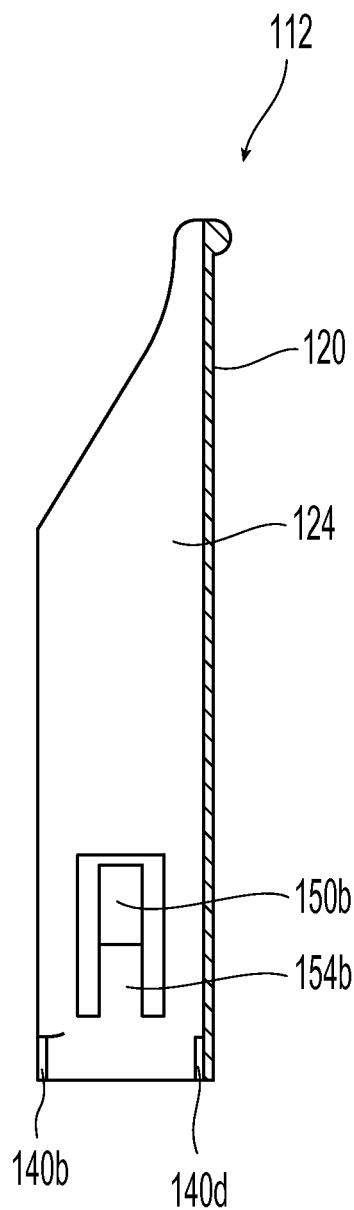
FIG. 10 is across sectional view of the sleeve in FIG. 9.

An alternative embodiment of the sleeve 112 is illustrated in FIGS. 9 and 10. The sleeve 112 has a body 120 with an external surface 122 and an internal surface 124. The interior surface 124 defines a central opening 126 that extends between a front end 128 and a back end 130. Rather than the handle 32 as in the first embodiment, sleeve 112 has as its handle 132 an extension of one side of the body 120. While the largest side of the body 120 is illustrated as being the handle 132, any of the sides of the body 120 could be longer to function as the handle 132.

The sleeve 112 also has first extensions 140 that are disposed in the sleeve 112 to engage the outer housing 16 as with the first embodiment. The first extensions 140 are illustrated as projections 140a and 140b in FIG. 9 that extend from the body 120 toward one another. The sleeve 112 also preferably has an opening 142 along one of the sides 144 that extends from the front end 128 to the back end 130 and the first extensions 140a and 140b extend from the body 120 towards one another and into the opening 142. While the first extensions 140a and 140b are illustrated as being shorter than those in sleeve 12, they could be same length, shorter or longer. Similarly, the first extensions 40a and 40b could be shorter than those illustrated herein and be within the scope of the invention. The first extensions 140 also include extensions 140c and 140d, which are raised portions extending from the internal surface 124 into the central opening 126.

Sleeve 112 also has second extensions 150 disposed on the internal surface 124 to engage the inner housing 14. The second extensions 150 in this embodiment are preferably raised portions 150a and 150b that extend into the central opening 126 from the cantilevered members 154a,154b in the side walls of sleeve 112. However, the second extensions 150 could also be the raised portions as in the first embodiment. Similarly, the second extensions 150 and cantilevered members 154 could also be used with the sleeve 12.

An alternative sleeve 212 is illustrated in FIGS. 11 and 12. Sleeve 212 has multiple openings to allow for multiple fiber optic connectors 10 to be inserted and removed at one time. Sleeve 212 has a body 220 with a front end 228 and a back end 230 with central openings 226a-226d extending therebetween to receive fiber optic connectors 10. While four central openings 226 are illustrated, more or fewer could be present. The sleeve 212 has a handle 232 extending from the back end 230 of the sleeve 212. Each of the central openings 226 have first and second extensions 240,250 to engage the fiber optic connectors. Some of the openings 226 may have tabs and raised portions for first extensions (e.g. central openings 226a and 226d), while others may have only the raised portions (e.g., 226c,226d). Each of the central openings 226 are illustrated as having second extensions 240 on cantilevered members 254, but they may also have raised portions similar to those in sleeve 12. Again, each of the central openings 226 may only have one or more of the first and second extensions 240,250, as noted above with other embodiments. Each of the central openings 226 may also be separate by walls 260 to provide stability and guidance for each of the fiber optic connectors.

Figure 13:
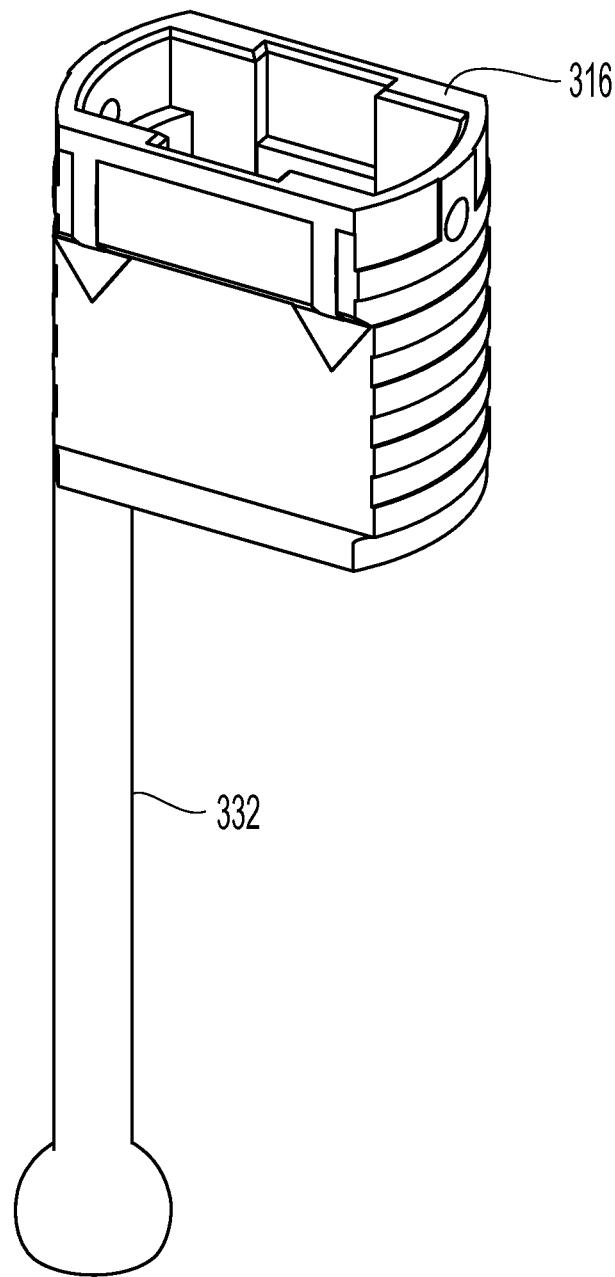
FIG. 13 is a perspective view of an outer housing with a handle attached thereto to remove a fiber optic connector from an adapter.

An alternative outer housing 316 is illustrated in FIG. 13. Outer housing 316 is similar to other outer housings for fiber optic connectors 10, but outer housing 316 has a hand 332 attached to a back end thereof. The handle 332 is helpful in removing the fiber optic connector 10 from a high density application, but does not have any features that correspond to the second extensions in the other embodiments and allow for insertion of the fiber optic connector 10. Thus, the outer housing 316 is useful where the boot or other portion of the fiber optic connector can be used to insert the fiber optic connector into the adapter 18.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A sleeve to be attached to an outer portion of a fiber optic connector to assist in installing and removing the fiber optic connector from an adapter comprising:
   a body having an interior surface and an exterior surface, the interior surface defining a central opening extending between a front end and a back end, the central opening configured to receive at least a portion of the fiber optic connector;
   at least one first extension extending from the body;
   at least one second extension extending from the interior surface into the central opening, the at least one second extension disposed between the at least one first extension and the back end; and
   an extended portion extending from a portion of the body away from the front end and beyond the back end.

2. The sleeve according to claim 1, wherein the at least one first extension is configured to engage an outer housing on the fiber optic connector and the at least one second extension is configured to engage an inner housing on the fiber optic connector.

3. The sleeve according to claim 1, the at least one first extension has a flat surface facing the back end of the sleeve to engage a forward facing surface of an outer housing on the fiber optic connector.

4. The sleeve according to claim 1, the at least one second extension has a flat surface facing the front end of the sleeve to engage a backward facing surface of an inner housing on the fiber optic connector.

5. The sleeve according to claim 1, wherein the body has an opening extending between the front end and back end along one side thereof.

6. The sleeve according to claim 1, wherein the extended portion is a generally round handle extending from the back end of the body.

7. The sleeve according to claim 1, wherein the extended portion is an extension of one side of the body.

8. The sleeve according to claim 1, wherein the at least one second extension extending from the interior surface comprises a raised surface disposed on an end of cantilevered member in a side wall of the body.

9. The sleeve according to claim 1, wherein the at least one first extension comprise at least two first extensions.

10. The sleeve according to claim 1, wherein the at least one second extension comprises at least two second extensions.

11. The sleeve according to claim 1, wherein the sleeve is removably attached to the fiber optic connector.

12. The sleeve according to claim 1, wherein the at least one first extension comprises at least four first extensions.

13. The sleeve according to claim 12, wherein two of the four first extensions comprise two tabs extending into an opening extending between the front end and back end along one side thereof and the other two of the first four first extensions comprise two raised portions extending from the interior surface of the body into the central opening.

14. The sleeve according to claim 1, wherein the sleeve sides forward and backward relative to the fiber optic connector.

15. The sleeve according to claim 1, wherein the at least one first extension engages the outer housing of the fiber optic connector when the sleeve is pulled in a backward direction.

16. The sleeve according to claim 1, wherein the at least one second extension engages the inner housing of the fiber optic connector when the sleeve is pushed in a forward direction.

17. A combination of a sleeve and a fiber optic connector, the fiber optic connector having an inner housing and an outer housing that are movable relative to one another, the sleeve being attached to the fiber optic connector and comprising:
   a body having an interior surface and an exterior surface, the interior surface defining a central opening extending between a front end and a back end to receive the fiber optic connector;
   at least one first extension extending from the body to engage the outer housing;
   at least one second extension extending from the interior surface into the central opening to engage the inner housing, the at least one second extension disposed between the at least one first extension and the back end; and
   an extended portion extending from a portion of the body away from the front end and beyond the back end.

18. A sleeve to install and remove multiple fiber optic connectors from a high density application, the sleeve comprising:
- a body having a front end and a back end and at least two central openings extending therebetween, each of the central openings configured to removably receive a fiber optic connector therein, each of the central openings having an internal surface;
- at least one first extension extending from the internal surface of each central opening to engage the outer housing;
- at least one second extension extending from the interior surface of each central opening to engage the inner housing, the at least one second extensions disposed between the at least one first extension and the back end; and
- an extended portion extending from a portion of the body away from the front end and beyond the back end to be used in installing and removing the fiber optic connector from an adapter.

* * * * *